(12) United States Patent
Shih et al.

(10) Patent No.: US 11,956,563 B2
(45) Date of Patent: Apr. 9, 2024

(54) METHOD FOR IDENTIFYING VIDEO SIGNAL SOURCE

(71) Applicant: BENQ CORPORATION, Taipei (TW)

(72) Inventors: Chia-Nan Shih, Taipei (TW); Chen-Chi Wu, Taipei (TW); Lin-Yuan You, Taipei (TW); Chin-Fu Chiang, Taipei (TW); Ron-Kun Tseng, Taipei (TW); Chuang-Wei Wu, Taipei (TW)

(73) Assignee: BenQ Corporation, Taipei (TW)

( * ) Notice: Subject to any disclaimer, the term of this patent is extended or adjusted under 35 U.S.C. 154(b) by 133 days.

(21) Appl. No.: 17/143,214

(22) Filed: Jan. 7, 2021

(65) Prior Publication Data

US 2021/0211745 A1 Jul. 8, 2021

(30) Foreign Application Priority Data

Jan. 7, 2020 (CN) .......................... 202010014552.3
Jan. 7, 2020 (CN) .......................... 202010014560.8

(51) Int. Cl.
| | |
|---|---|
| *H04N 5/445* | (2011.01) |
| *G06F 21/73* | (2013.01) |
| *H04L 65/75* | (2022.01) |
| *H04N 7/15* | (2006.01) |
| *H04N 21/226* | (2011.01) |
| *H04N 21/647* | (2011.01) |

(52) U.S. Cl.
CPC ......... *H04N 5/44504* (2013.01); *G06F 21/73* (2013.01); *H04L 65/75* (2022.05); *H04N 7/15* (2013.01); *H04N 21/2265* (2013.01); *H04N 21/647* (2013.01)

(58) Field of Classification Search
CPC ............ H04N 21/2265; H04N 21/647; H04N 5/44504; H04N 7/15; H04L 65/75; G06F 21/73

See application file for complete search history.

(56) References Cited

U.S. PATENT DOCUMENTS 10,264,213 B1 * 4/2019 Sculley ................ H04L 65/403
10,638,090 B1 4/2020 Sculley
(Continued)

FOREIGN PATENT DOCUMENTS

| CN | 101022529 A | 8/2007 |
| CN | 104106037 A | 10/2014 |
(Continued)

OTHER PUBLICATIONS

Office action of counterpart application by EPO dated May 19, 2021.
(Continued)

*Primary Examiner* — James R Sheleheda

(57) ABSTRACT

A method for identifying video signal source is provided. The method includes the following steps. A first identification code is assigned to a first transmitter device by a receiver control unit of a receiver device. A first video data is transmitted by the first transmitter device. The first video data and a first identification image corresponding to the first identification code are combined as a first combined video data by the receiver control unit. The first combined video data is outputted to a display device by the receiver control unit.

17 Claims, 15 Drawing Sheets

(56) References Cited

U.S. PATENT DOCUMENTS

| | | | |
|---|---|---|---|
| 2006/0031779 A1* | 2/2006 | Theurer | G06F 3/1454 |
| | | | 715/781 |
| 2007/0188598 A1* | 8/2007 | Kenoyer | H04N 7/15 |
| | | | 348/E7.083 |
| 2008/0184127 A1* | 7/2008 | Rafey | G06F 16/4393 |
| | | | 709/229 |
| 2012/0169835 A1 | 7/2012 | Woo | |
| 2014/0285614 A1 | 9/2014 | Epstein et al. | |
| 2015/0215579 A1 | 7/2015 | Wang et al. | |
| 2016/0105642 A1* | 4/2016 | Nagase | H04M 1/724 |
| | | | 348/14.08 |
| 2017/0195374 A1 | 7/2017 | Vu et al. | |
| 2019/0147402 A1* | 5/2019 | Sitrick | H04L 12/1822 |
| | | | 705/301 |
| 2019/0335141 A1* | 10/2019 | Chen | G09G 5/38 |
| 2021/0074298 A1* | 3/2021 | Coeytaux | H04N 7/147 |
| 2021/0211745 A1* | 7/2021 | Shih | H04L 65/75 |
| 2023/0033727 A1* | 2/2023 | Gawande | H04L 51/10 |

FOREIGN PATENT DOCUMENTS

| | | |
|---|---|---|
| CN | 106879113 A | 6/2017 |
| CN | 109871190 A | 6/2019 |
| CN | 110381441 A | 10/2019 |
| CN | 110460890 A | 11/2019 |
| TW | 201528155 A | 7/2015 |
| WO | 2012088419 A1 | 6/2012 |
| WO | WO-2012088419 A1 * | 6/2012 ............... G09B 7/02 |
| WO | 2017117278 A1 | 6/2017 |
| WO | WO-2017117278 A1 * | 7/2017 ........... H04L 65/403 |

OTHER PUBLICATIONS

Office action of counterpart application by EPO dated May 20, 2021.

Office action of counterpart application by Taiwan IP Office dated Mar. 17, 2021.

Office action of counterpart application by Taiwan IP Office dated Dec. 4, 2020.

Office action of counterpart application by Taiwan IP Office dated Dec. 16, 2021.

Office action of related US application cited by the USPTO dated Jun. 11, 2021.

Office action of counterpart application by EPO dated Nov. 15, 2023.

Office action of counterpart application by EPO dated Nov. 23, 2023.

* cited by examiner

METHOD FOR IDENTIFYING VIDEO SIGNAL SOURCE

This application claims the benefit of People's Republic of China application Serial No. 202010014552.3, filed Jan. 7, 2020, and People's Republic of China application Serial No. 202010014560.8, filed Jan. 7, 2020 the subject matters of which are incorporated herein by reference.

BACKGROUND OF THE INVENTION

Field of the Invention

The invention relates in general to a method for identifying video signal source.

Description of the Related Art

Conventionally, when a presenter wants to operate an information processing device (such as a notebook computer) to perform presentation using a display device, the presenter have to use a video signal line (such as a HDMI video transmission line) to connect the information processing device and the display device (such as a projector or large-sized TV), such that the presentation image data outputted from the information processing device can be transmitted to the display device, and the display device accordingly shows the presentation image data. However, the above method for connecting the information processing device and the display device using a wired video signal line is subjected to many restrictions. For example, when the presenter wants to show the presentation material stored in another information processing device, the presenter should firstly remove the video signal line from the original information processing device and then connects the video signal line to another information processing device. By doing so, the conference will inevitably be interrupted.

To resolve the above operation inconvenience, a multi-user wireless presentation system is provided in the market. The multi-user wireless presentation system normally includes several transmitter devices and a receiver device. A transmitter device is connected to the video output port of each conference participant's information processing device, and the receiver device is connected to the video input port of a display device. When only a presenter presses the projection button on a transmitter device, one of the transmitter devices will perform wireless image data transmission with the receiver device and the display device will only show the image data outputted from one information processing device. However, when many presenters concurrently press the projection buttons on their transmitter devices, the several transmitter devices will perform wireless image data transmission with the receiver device, and the display device will show the image data outputted from the information processing devices in the form of split screen. Under the split-screen display state, the conference participants may easily get confused and are unable to identify which presenter's information processing device is providing the video signal source corresponding to a particular frame on the split screen shown on the display device. Therefore, when a conference participant has questions regarding a particular frame of the split screen, the conference participant needs to additionally inquire which presenter is providing the presentation material shown on the particular frame of the split screen before the conference participant can raise question to the right person.

SUMMARY OF THE INVENTION

The invention is directed to a method for identifying video signal source capable of effectively resolving the above problems encountered in the prior art.

According to a first aspect of the present invention, a method for identifying frame signal source is provided. The method includes the following steps: A first identification code is assigned to a first transmitter device by a receiver control unit of a receiver device. A first video data is transmitted by the first transmitter device. The first video data and a first identification image corresponding to the first identification code are combined as a first combined video data by the receiver control unit. The first combined video data is outputted to a display device by the receiver control unit.

According to a second aspect of the present invention, a method for identifying frame signal source is provided. The method includes the following steps. A first video data and a first identification code are transmitted to a receiver control unit of a receiver device by a first transmitter device. The first video data and a first identification image corresponding to the first identification code are combined as a first combined video data by the receiver control unit. The first combined video data is outputted to a display device by the receiver control unit.

According to a third aspect of the present invention, a method for identifying video signal source is provided. The method includes the following steps. A first video data and a first identification image corresponding to a first identification code are combined as a first combined video data by a first transmitter control unit of a first transmitter device. The first combined video data is transmitted to a receiver control unit of a receiver device by the first transmitter device. The first combined video data is outputted to a display device by the receiver control unit.

According to a fourth aspect of the present invention, a method for identifying video signal source is provided. The method includes the following steps. A first identification code and a second identification code are respectively assigned to a first transmitter device and a second transmitter device by a receiver control unit of a receiver device. When the receiver control unit receives a first video data from the first transmitter device and receives a second video data from the second transmitter device at the same time, the receiver control unit combines the first video data and a first identification image corresponding to the first identification code as a first combined video data, combines the second video data and a second identification image corresponding to the second identification code as a second combined video data, and combines the first combined video data and the second combined video data as a split screen video data and outputs the split screen video data to a display device.

According to a fifth aspect of the present invention, a method for identifying video signal source is provided. The method includes the following steps. When a receiver control unit of a receiver device receives a first video data and a first identification code from a first transmitter device and receives a second video data and a second identification code from a second transmitter device at the same time, the receiver control unit combines the first video data and a first identification image corresponding to the first identification code as a first combined video data, combines the second video data and the second identification image corresponding to the second identification code as a second combined video data, and combines the first combined video data and the second combined video data as a split screen video data and outputs the split screen video data to a display device.

According to a sixth aspect of the present invention, a method for identifying video signal source is provided. The method includes the following steps. When a receiver control unit of a receiver device receives a first video data from a first transmitter device and receives a second video data from a second transmitter device at the same time, the receiver control unit notifies the first transmitter control unit to combine the first video data and a first identification image corresponding to a first identification code as a first combined video data, and notifies the second transmitter control unit to combine the second video data and a second identification image corresponding to the second identification code as a second combined video data. The first transmitter device transmits the first combined video data to the receiver control unit. The second transmitter device transmits the second combined video data to the receiver control unit by the second transmitter device. The receiver control unit combines the first combined video data and the second combined video data as a split screen video data and outputs the split screen video data to a display device.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
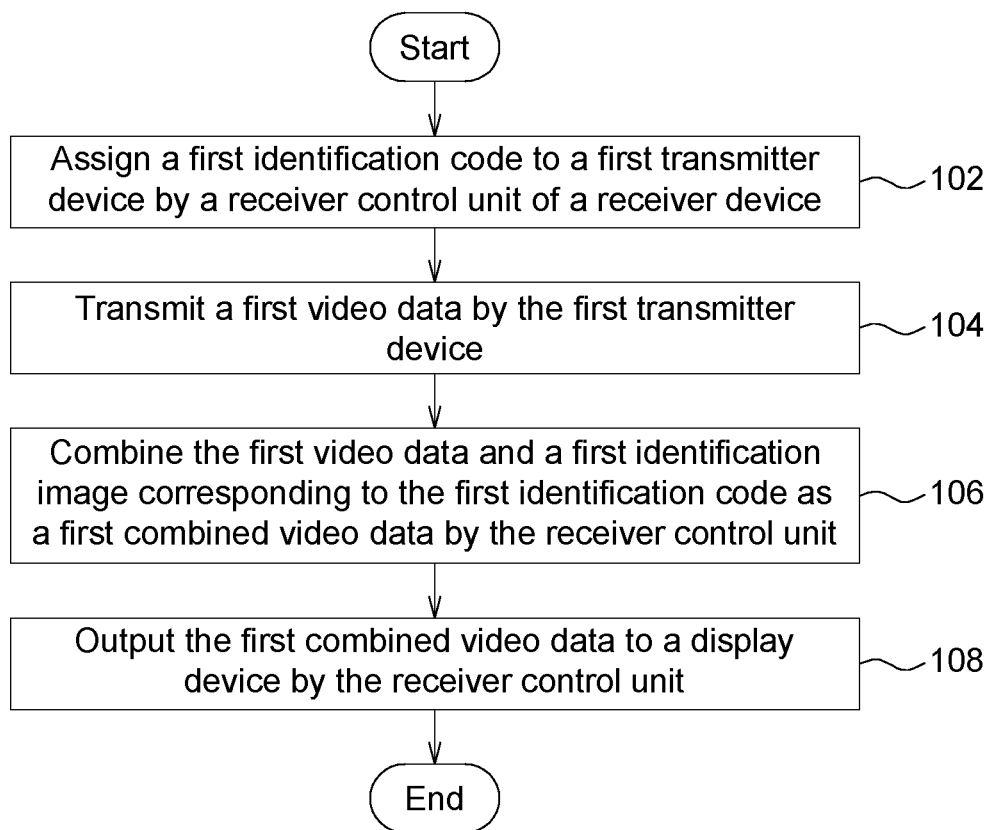
FIG. 1 is a flowchart of a method for identifying video signal source according to a first embodiment of the present disclosure.
Figure 3:
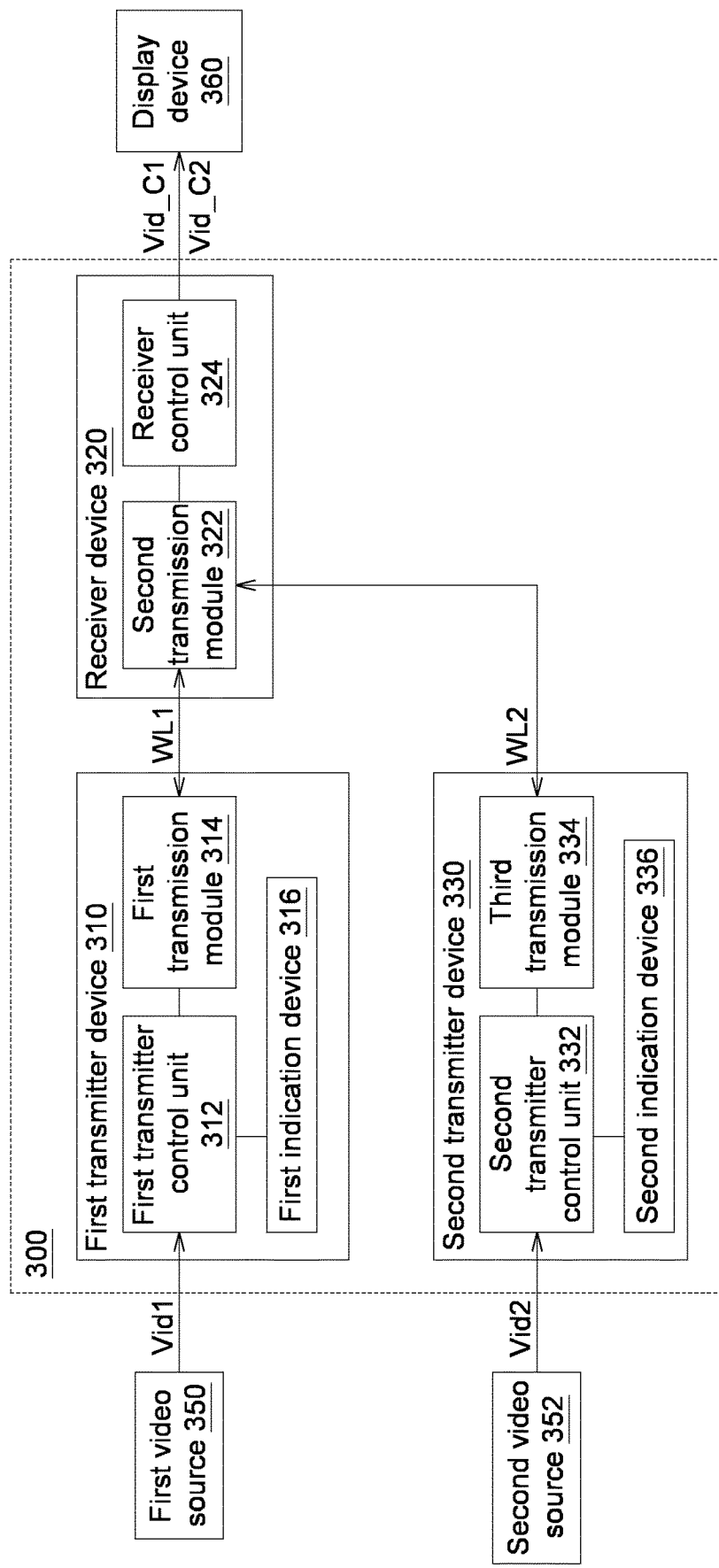
FIG. 3 is a block diagram of a wireless presentation system according to a first embodiment of the present disclosure.

Referring to FIG. 1, a flowchart of a method for identifying video signal source according to a first embodiment of the present disclosure is shown. Referring to FIG. 3, a block diagram of a wireless presentation system 300 according to a first embodiment of the present disclosure is shown. As shown in FIG. 1, the method for identifying video signal source of the present disclosure includes the following steps. In step 102, a first identification code is assigned to a first transmitter device 310 by a receiver control unit 324 of a receiver device 320. In step 104, a first video data is transmitted by the first transmitter device 310. In step 106, the first video data and a first identification image corresponding to the first identification code are combined as a first combined video data by the receiver control unit 324. In step 108, the first combined video data is outputted to the display device 360 by the receiver control unit 324.

As shown in FIG. 3, the wireless presentation system includes a first transmitter device 310 and a receiver device 320, and may selectively include a second transmitter device 330. The first transmitter device 310 includes a first transmitter control unit 312 and a first transmission module 314. The first transmitter control unit 312 is configured to receive a first video data Vid1 from the first video source 350. The first transmission module 314 is configured to transmit the first video data Vid1. Similarly, the second transmitter device 330 includes a second transmitter control unit 332 and a third transmission module 334. The second transmitter control unit 332 is configured to receive a second video data Vid2 from the second video source 352. The third transmission module 334 is configured to transmit the second video data Vid2. The receiver device 320 includes a second transmission module 322 and a receiver control unit 324. The second transmission module 322 may selectively establish a wireless transmission WL1 with the first transmission module 314 to receive the first video data Vid1, and may selectively establish a wireless transmission WL2 with the third transmission module 334 to receive the second video data Vid2.

Figure 2A:
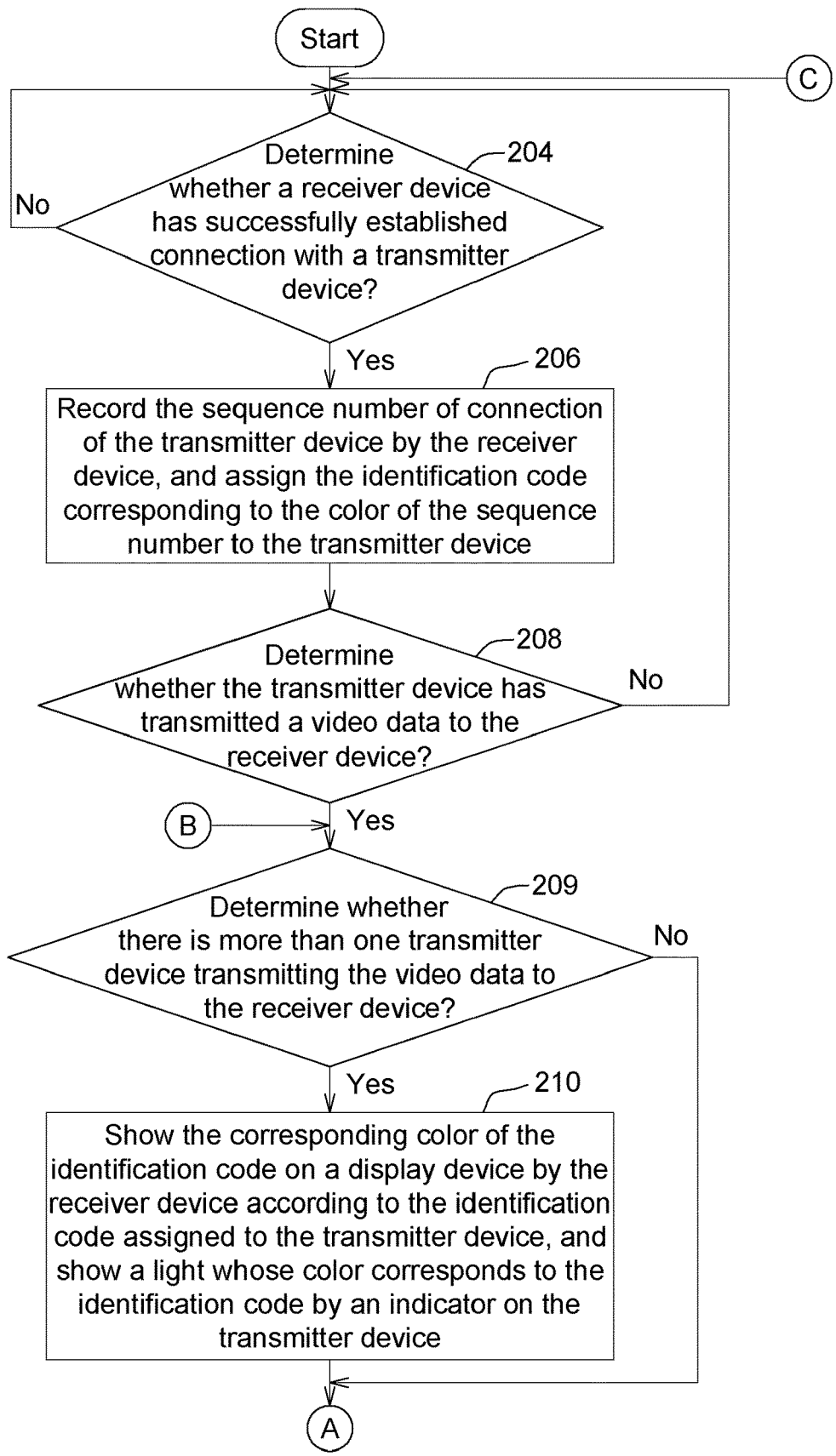
FIG. 2A and FIG. 2B is an example of a detailed flowchart of the method for identifying video signal source of FIG. 1.
Figure 2B:
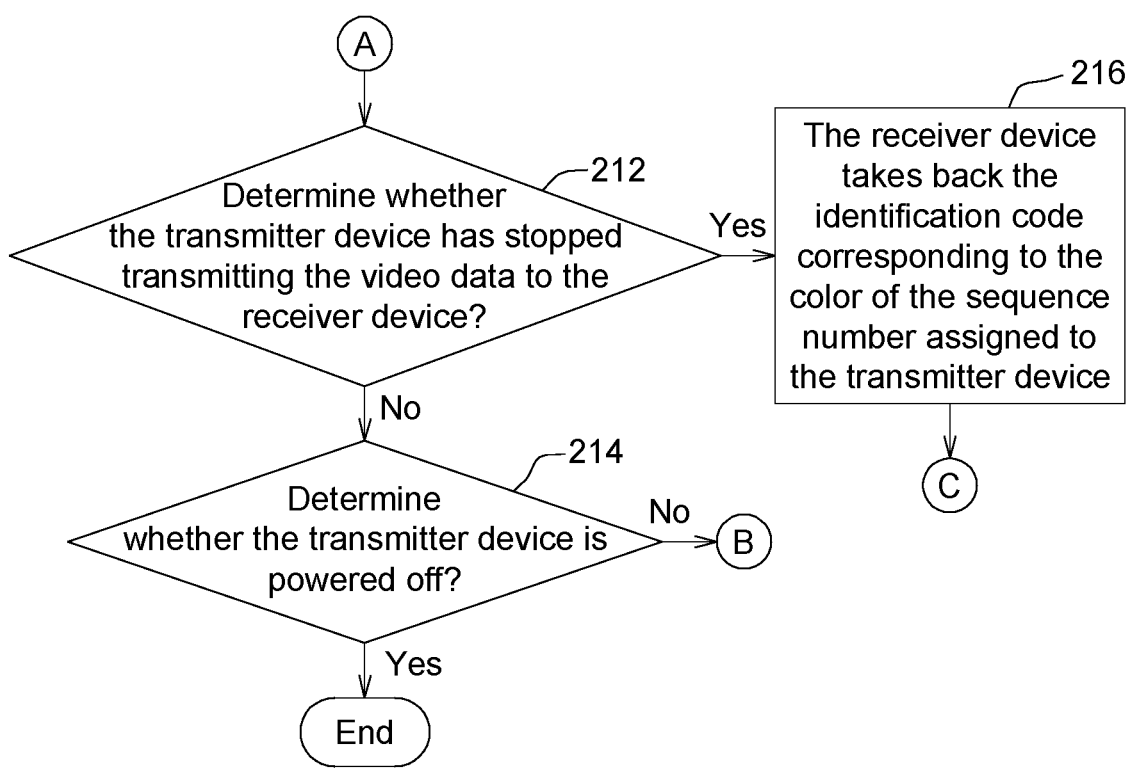

Referring to FIG. 2A and FIG. 2B, an example of a detailed flowchart of the method for identifying video signal source of FIG. 1 is shown. In step 102, when the receiver device 320 establishes connection with the first transmitter device 310, a first identification code is assigned to the first transmitter device 310 by the receiver control unit 324, and details of step 102 include steps 204~206 of FIG. 2A. In step 204, whether the receiver device 320 has successfully established connection with the transmitter device is determined. When the connection has been successfully established, the method proceeds to step 206. In step 206, the sequence number of connection of the transmitter device is recorded by the receiver device 320, and the identification code corresponding to the color of the sequence number is assigned to the transmitter device. In step 204, after the receiver device 320 and the first transmitter device 310 are connected to a power source, the user can press the matched buttons on the receiver device 320 and the first transmitter device 310, and the two devices will try to establish connection with each other. After the first transmission module 314 of the first transmitter device 310 establishes connection with the second transmission module 322 of the receiver device 320, the method proceeds to step 206. In step 206, internal information of the receiver device 320 and the first transmitter device 310 are mutually updated with each other, the sequence number of connection of the first transmitter device 310 is recorded and the identification code corresponding to the color of the sequence number is assigned to the transmitter device by the receiver device 320. The first transmitter control unit 312 and the receiver control unit 324 both pre-store a list of identification codes and corresponding indicator colors. For example, an identification code #1 is assigned to the first one of the transmitter devices that has successfully established connection with the receiver device 320 and the corresponding color of the first identification image is red; an identification code #2 is assigned to the second one of the transmitter devices that has successfully established connection with the receiver device 320, and the corresponding color of the second identification image is green, and the rest can be obtained by the same analogy. Thus, when the first transmitter device 310 is the first one of the transmitter devices that has successfully established connection, the receiver control unit 324 records that the first transmitter device 310 has the first sequence number to establish connection and assigns the identification code #1 to the first transmitter device 310. Similarly, when the second transmitter device 330 is afterwards connected to a power source and becomes the second one of the transmitter devices that has successfully established connection with the receiver device 320, the receiver control unit 324 records that the second transmitter device 330 has the second sequence number to establish connection and assigns the identification code #2 to the second transmitter device 330. By looking up the list of identification codes and corresponding indicator colors, the receiver control unit 324 can obtain that the color of the first identification image corresponding to the identification code #1 is red, and the color of the second identification image corresponding to the identification code #2 is green. In the present embodiment, the first identification image and the second identification image are respectively exemplified by red and green, but the disclosure is not limited thereto. For example, the first identification image and the second identification image can also be exemplified by numeric numbers "1" and "2" or English alphabets "A" and "B".

Details of step 104 include step 208 of FIG. 2A. In step 208, whether the transmitter device has transmitted a video data to the receiver device 320 is determined. If yes, the method proceeds to step 210. When the first transmission module 314 of the first transmitter device 310 has established connection with the second transmission module 322 of the receiver device 320 but the first user has not yet pressed the projection button on the first transmitter device 310, the first transmitter device 310 does not transmit the first video data Vid1 to the receiver device 320. After the first user presses the projection button on the first transmitter device 310, the first transmitter device 310 starts to transmit the first video data Vid1 to the receiver device 320. Thus, the condition of step 208 is satisfied, and the method proceeds to step 210. By the same analogy, after the third transmission module 334 of the second transmitter device 330 establishes connection with the second transmission module 322 of the receiver device 320, the second transmitter device 330 starts to transmit the second video data Vid2 to the receiver device 320 when the second user presses the projection button on the second transmitter device 330.

In the present embodiment as shown in FIG. 2A and FIG. 2B, the method for identifying video signal source may selectively include step 209. In step 209, whether there is more than one transmitter device transmitting the video data to the receiver device 320 is determined. If yes, the method proceeds to step 210; otherwise, the method skips step 210. In step 209, the receiver control unit 324 can dynamically turn off the video combining circuit of the receiver control unit to dynamically reduce the power consumption of the receiver control unit 324 and achieve power saving. Step 209 has scenarios (1) and (2) disclosed below. Scenario (1): Both the first transmitter device 310 and the second transmitter device 330 have already established connection with the receiver device 320, but only the first transmitter device 310 is transmitting the first video data Vid1 to the receiver device 320 and the entire screen of the display device 360 is showing the first video data Vid1. Under such circumstance, the conference participants can clearly identify the presenter who is currently operating the first transmitter device 310 outputting the first video data Vid1, and the receiver control unit 324 does not need to show the corresponding color of the identification code on the display device 360. For example, the receiver control unit 324 can turn off the video combining circuit of the receiver control unit 324 and skip step 210 to reduce the power consumption of the receiver control unit 324. Scenario (2): When both the first transmitter device 310 and the second transmitter device 330 have already established connection with the receiver device 320 and the first transmitter device 310 transmits the first video data Vid1 to the receiver device and at the same time the second transmitter device 330 transmits the second video data Vid2 to the receiver device 320, the display device 360 shows the first video data Vid1 and the second video data Vid2 in the form of split screen. Under such circumstance, the conference participants cannot clearly identify the video signal source, and the receiver control unit 324 needs to show the corresponding color of the identification code on the display device 360. For example, the receiver control unit 324 turns on the video combining circuit of the receiver control unit 324 and performs step 210.

Figure 4A:
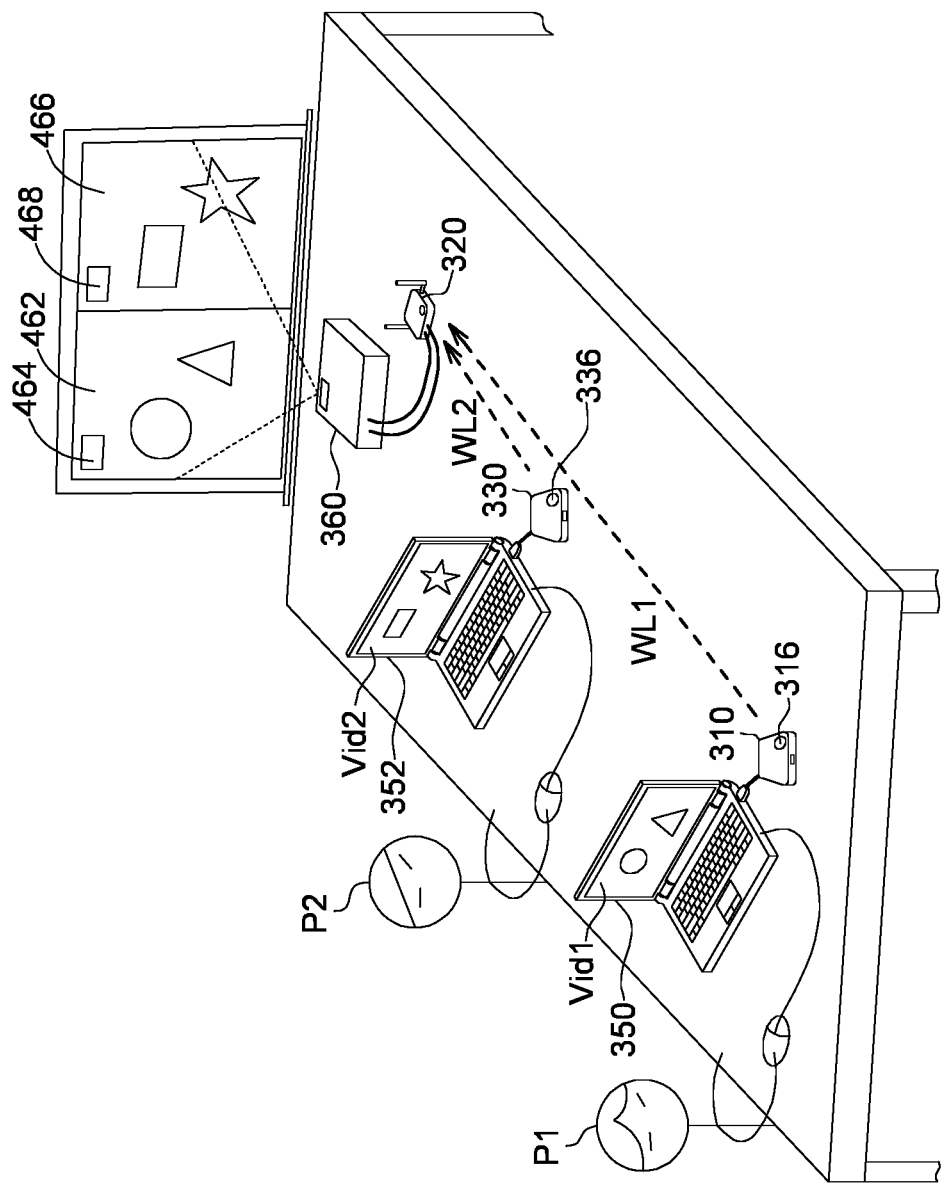
FIG. 4A is a schematic diagram of an application scenario of the wireless presentation system of FIG. 3.

Details of steps 106~108 include step 210 of FIG. 2A. In step 210, the corresponding color of the identification code is shown on the display device 360 by the receiver device 320 according to the identification code assigned to the transmitter device, and the indicator on the transmitter device shows a light whose color corresponds to the identification code. When the first transmitter device 310 transmits the first video data Vid1 to the second transmission module 322, the receiver control unit 324 combines the first video data Vid1 and the first identification image (such as a red identification image) as a first combined video data Vid_C1 and outputs the first combined video data Vid_C1 to the display device 360. When the first combined video data Vid_C1 is shown on the display device 360, as shown in FIG. 4A, the first combined video data Vid_C1 corresponds to a first video region 462 and a first identification region 464 adjacent to the first video region 462. The first video region 462 shows the first video data Vid1, and the first identification region 464 shows the first identification image. The receiver control unit 324 sends a prompt instruction to request the first indication device 316 of the first transmitter device 310 to show the first identification image. In the present embodiment, the receiver control unit 324 combines the first video data Vid1 and a red identification image as the first combined video data Vid_C1, such that the display device 360 shows a corresponding red identification image, and the indicator on the first transmitter device 310 shows a red light corresponding to the identification code #1. By the same analogy, the receiver control unit 324 combines the second video data Vid2 and a green identification image as a second combined video data Vid_C2 and outputs the second combined video data Vid_C2 to the display device 360, such that the display device 360 shows a corresponding green identification image, and the second indication device 336 (such as an indicator) on the second transmitter device 330 shows a green light corresponding to the identification code #2.

Figure 4B:
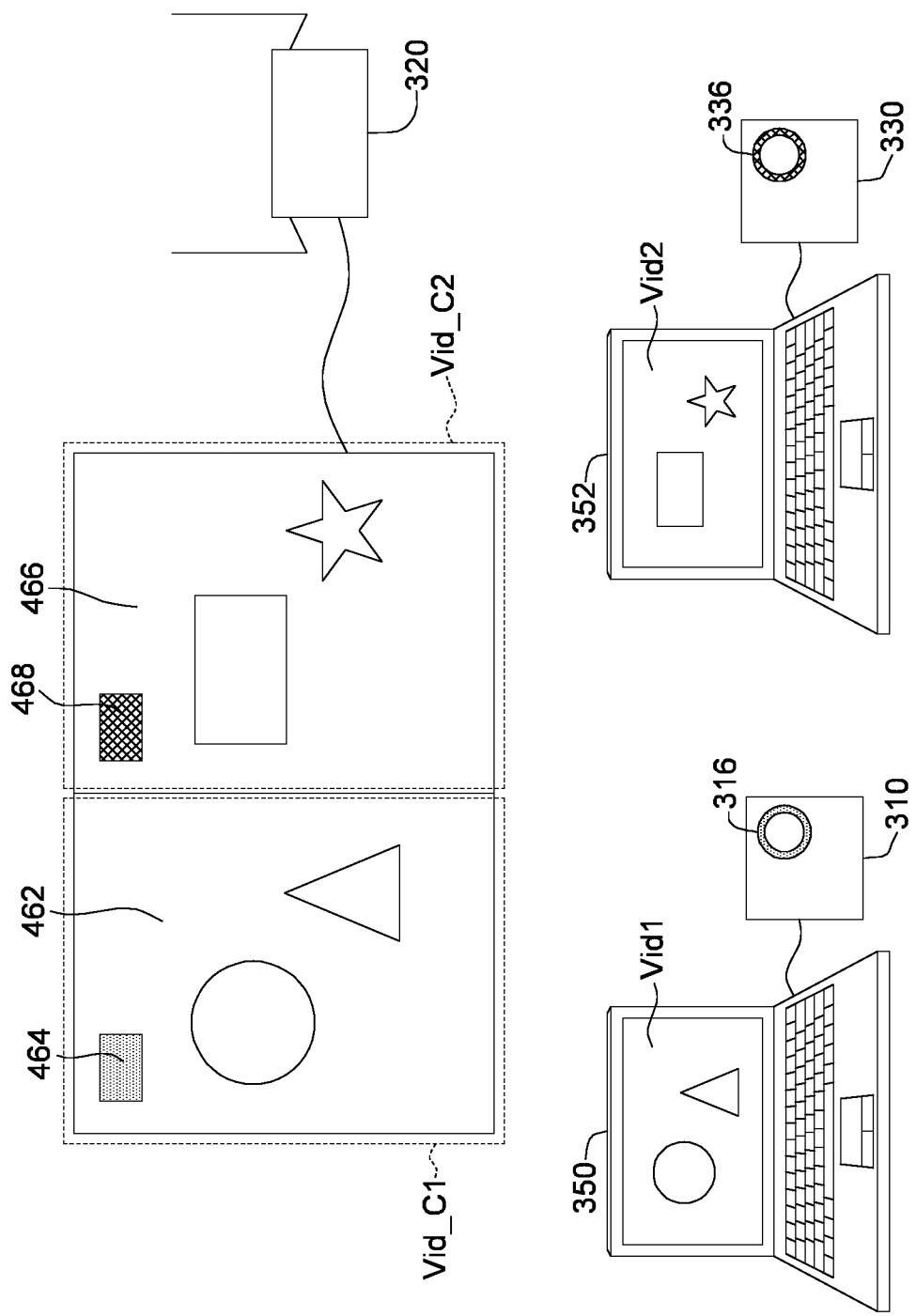
FIG. 4B is a schematic diagram of an image region and an identification region according to an embodiment of FIG. 4A.

Referring to FIGS. 4A~4B, a schematic diagram of an application scenario of the wireless presentation system of the present disclosure and a schematic diagram of an image region and an identification region according to an embodiment are respectively shown. The first video source 350 (such as a notebook computer) operated by the first user P1 outputs a first video data Vid1 to the first transmitter device 310, and the second video source 352 (such as a notebook computer) operated by the second user P2 outputs a second video data Vid2 to the second transmitter device 330. The first transmitter device 310 and the second transmitter device 330 both establish connection with the receiver device 320. When the first transmitter device 310 is the first one of the transmitter devices that has established connection with the receiver device 320, an identification code #1 is assigned to the first transmitter device 310. When the first combined video data Vid_C1 is shown on the display device 360, the first combined video data Vid_C1 corresponds to both the first video region 462 and the first identification region 464 at the left half of the display device 360. The first video region 462 is adjacent to the first identification region 464, the first video region 462 shows the first video data Vid1, and the first identification region 464 shows a red identification image corresponding to the identification code #1. As shown in FIG. 4B, the first identification region 464 is located at the top left corner of the first video region 462, and a red block is shown at the top left corner. By the same analogy, when the second transmitter device 330 is the second one of the transmitter devices that has established connection with the receiver device 320, an identification code #2 is assigned to the second transmitter device 330. When the second combined video data Vid_C2 is shown on the display device 360, the second combined video data Vid_C2 corresponds to both the second video region 466 and the second identification region 468 located at the right half of the display device 360. The second video region 466 is adjacent to the second identification region 468, the second video region 466 shows the second video data Vid2, and the second identification region 468 shows a green identification image corresponding to the identification code #2. The second identification region 468 is located at the top left corner of the second video region 466, and a green block is shown at the top left corner. As shown in FIG. 4B, the receiver control unit 324 assigns the second identification code (such as an identification code #2) to the second transmitter device 330, the second transmitter device 330 transmits the second video data Vid2, and the receiver control unit 324 combines the second video data Vid2 and the second identification image corresponding to the second identification code (such as a green identification image) as a second combined video data Vid_C2 and outputs the first combined video data Vid_C1 and the second combined video data Vid_C2 to the display device 360. The first combined video data Vid_C1 and the second combined video data Vid_C2 are shown on the display device 360 in the form of split screen. For example, the receiver control unit 324 combines the first combined video data Vid_C1 and the second combined video data Vid_C2 as a split screen video data and outputs the split screen video data to the display device 360.

Figure 4C:
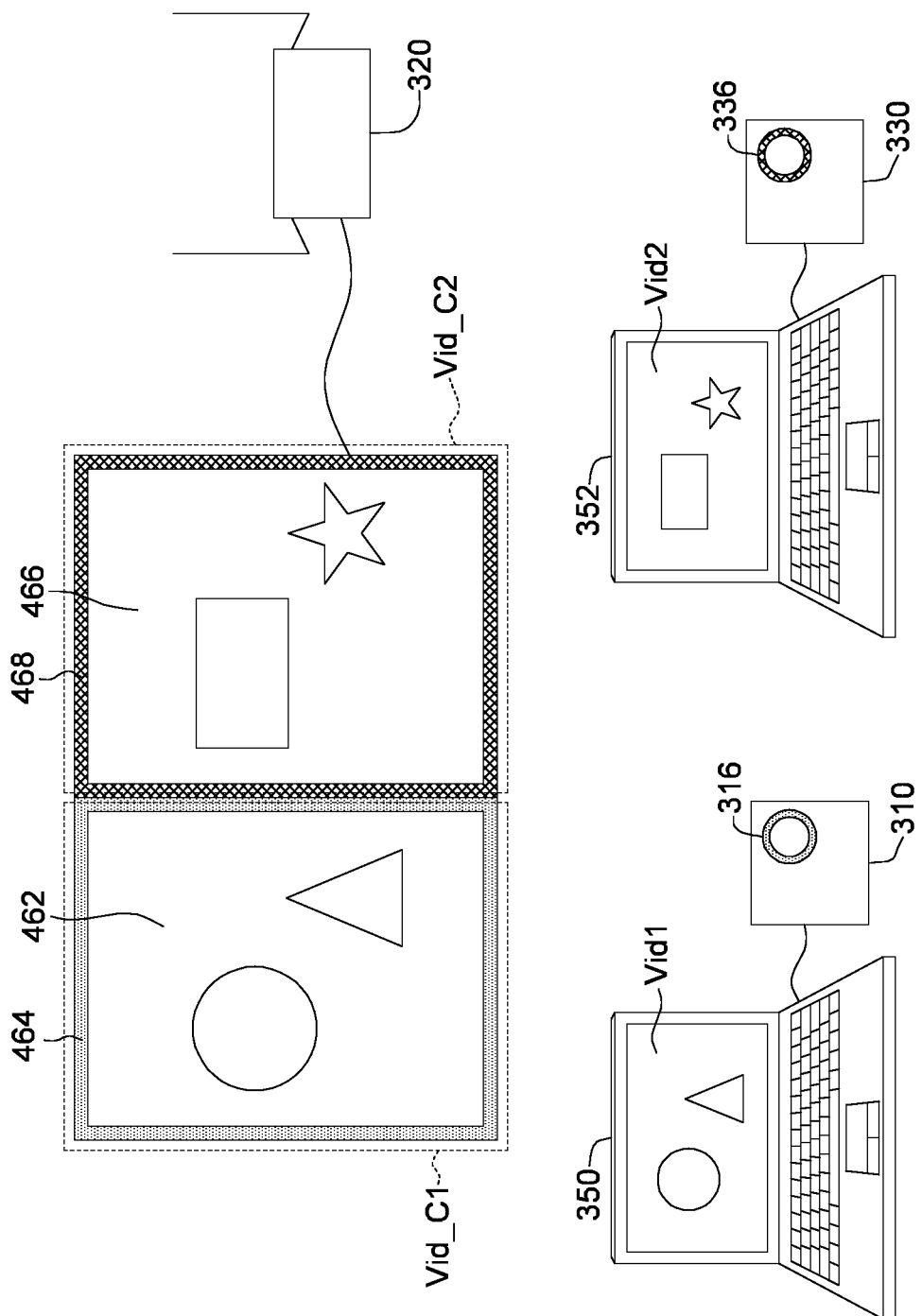
FIG. 4C is a schematic diagram of an image region and an identification region according to another embodiment of FIG. 4A.

Referring to FIG. 4C, a schematic diagram of an image region and an identification region according to another embodiment is shown. The first identification region 464 surrounds an outer periphery of the first video region 462, and a red outline border is shown in the outer periphery. The second identification region 468 surrounds an outer periphery of the second video region 466, and a green outline border is shown in the outer periphery.

The first transmitter device 310 has a first indicator 316 disposed thereon, and the receiver control unit 324 sends a prompt instruction to request the first indicator on the first transmitter device 310 to show a red identification image. Under such circumstance, the conference participants can clearly understand the corresponding relation among the first video region 462, the red identification image in the first identification region 464 and the red identification image shown by the first indicator and easily conclude that the video signal source of the first video region 462 located at the left half of the display device 360 is the first video source 350 operated by the first user. By the same analogy, the second transmitter device 330 has a second indicator 336 disposed thereon, and the receiver control unit 324 sends a prompt instruction to request the second indicator on the second transmitter device 330 to show a green identification image. Under such circumstance, the conference participants can clearly understand the corresponding relation among the second video region 466, the green identification image shown in the second identification region 468 and the green identification image shown by the second indicator and easily conclude that the video signal source of the second video region 466 at the right half of the display device 360 is the second video source 352 operated by the second user. In the present embodiment, the adjacency relation between the first video region 462 and the first identification region 464 is exemplified by the arrangement that the first identification region 464 is at a corner or an outer periphery of the first video region 462, but the disclosure is not limited thereto.

In the first embodiment, the wireless presentation system of the present disclosure may selectively perform the step of cancelling the corresponding relation between the first identification code and the first transmitter device 310 by the receiver control unit 324 when the first transmitter device 310 stops transmitting the first video data Vid1 to the second transmission module 322. Details of the step of cancelling the corresponding relation between the first identification code and the first transmitter device 310 include steps 212 and 216 of FIG. 2B. In step 212, whether the transmitter device has stopped transmitting the video data to the receiver device 320 is determined. If yes, the method proceeds to step 216. In step 216, the receiver device 320 takes back the identification code corresponding to the color of the sequence number assigned to the transmitter device. For example, the receiver control unit 324 takes back the identification code #1 previously assigned to the first transmitter device 310 and the red identification image corresponding to the identification code #1. Afterwards, when another transmitter device establishes connection with the receiver device 320, the identification code #1 and its corresponding red identification image are assigned to the newly connected transmitter device.

In the first embodiment, the wireless presentation system of the present disclosure may selectively perform step 214 of FIG. 2B to determine whether the transmitter device is powered off. Thus, when the first transmitter device 310 continues to transmit the first video data Vid1 to the second transmission module 322 and the transmitter device is not powered off, the receiver control unit 324 continues to output the first combined video data Vid_C1 to the display device 360.

Figure 5:
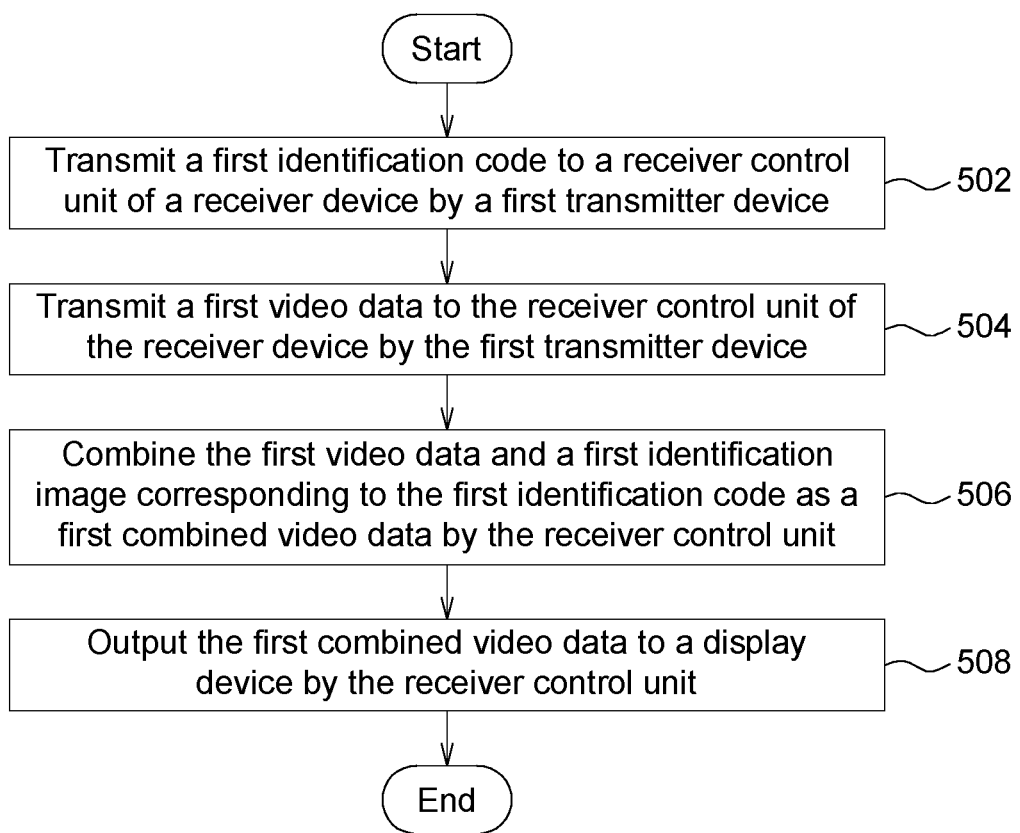
FIG. 5 is a flowchart of a method for identifying video signal source according to a second embodiment of the present disclosure.
Figure 6:
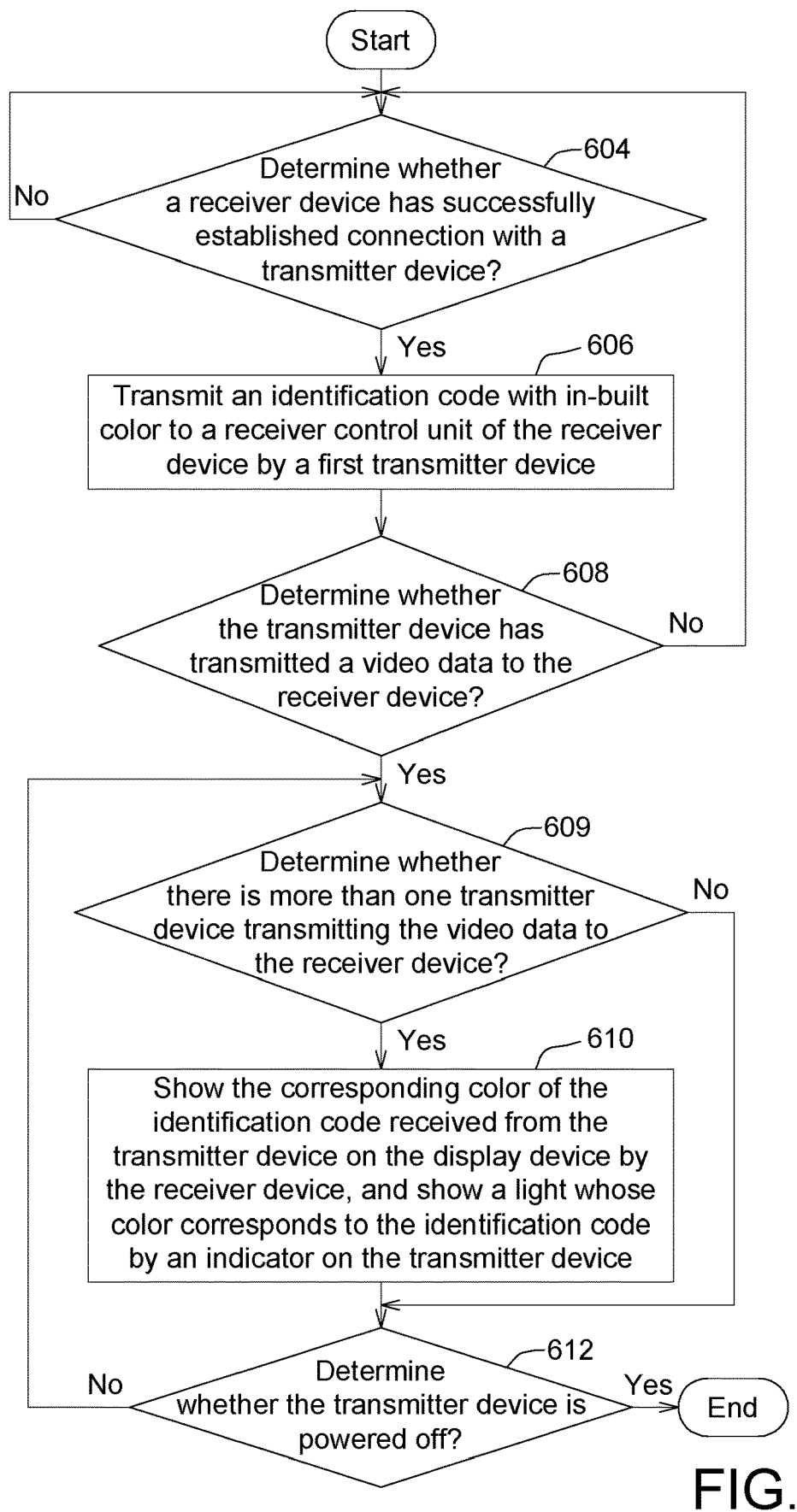
FIG. 6 is an example of a detailed flowchart of the method for identifying video signal source of FIG. 5.

Referring to FIG. 5, a flowchart of a method for identifying video signal source according to a second embodiment of the present disclosure is shown. The method for identifying video signal source according a second embodiment of the present disclosure can adopt the hardware structure of the wireless presentation system as shown in of FIG. 3 and only needs to modify the firmware programs of the first transmitter control unit 312, the second transmitter control unit 332 and the receiver control unit 324, such that the first transmitter control unit 312, the second transmitter control unit 332 and the receiver control unit 324 together can perform the steps of the method as shown in FIGS. 5~6. As shown in FIG. 5, the method for identifying frame signal source of the present disclosure includes the following steps: In step 502: a first identification code is transmitted to the receiver control unit 324 of the receiver device 320 by the first transmitter device 310. In step 504, a first video data Vid1 is transmitted to the receiver control unit 324 of the receiver device 320 by the first transmitter device 310. In step 506, the first video data Vid1 and a first identification image corresponding to the first identification code are combined as a first combined video data Vid_C1 by the receiver control unit 324. In step 508, the first combined video data Vid_C1 is outputted to the display device 360 by the receiver control unit 324.

Referring to FIG. 6, an example of a detailed flowchart of the method for identifying video signal source of FIG. 5 is shown. In step 502, when the receiver device 320 establishes connection with the first transmitter device 310, the first identification code is transmitted to the receiver control unit 324 of the receiver device 320 by the first transmitter device 310, and the details of step 502 include steps 604~606 of FIG. 6. In step 604, whether the receiver device 320 has established connection with the transmitter device is determined. When the connection has been successfully established, the method proceeds to step 606. In step 606, an identification code with in-built color is transmitted to the receiver control unit 324 of the receiver device 320 by the first transmitter device 310. In step 604, after the receiver device 320 and the first transmitter device 310 are connected to a power source, the user can press the matched buttons on the receiver device 320 and the first transmitter device 310, and the two devices will try to establish connection with each other. After the first transmission module 314 of the first transmitter device 310 establishes connection with the second transmission module 322 of the receiver device 320, the method proceeds to step 606, internal information of the receiver device 320 and the first transmitter device 310 are mutually updated to each other, and the first identification code is transmitted to the receiver control unit 324 of the receiver device 320 by the first transmitter device 310. The first transmitter control unit 312 and the receiver control unit 324 both pre-store a list of identification codes and corresponding indicator colors. For example, an identification code #1 is assigned to the first transmitter device 310 after manufacture and the corresponding color of the first identification image is red; an identification code #2 is assigned to the second transmitter device 330 after manufacture and the corresponding color of the second identification image is green; and the rest can be obtained by the same analogy. Thus, after the first transmitter device 310 establishes connection with the receiver device 320, the receiver control unit 324 records that the first transmitter device 310 has the identification code #1. Similarly, afterwards, when the second transmitter device 330 establishes connection with the receiver device 320, the receiver control unit 324 records that the second transmitter device 330 has the identification code #2. By looking up the list of identification codes and corresponding indicator colors, the receiver control unit 324 can obtain that the color of the first identification image corresponding to the identification code #1 is red, and the color of the second identification image corresponding to the identification code #2 is green. In the present embodiment, the first identification image and the second identification image are respectively exemplified by red and green, but the embodiment is not limited thereto. For example, the first identification image and the second identification image can also be exemplified by numeric numbers "1" and "2" or English alphabets "A" and "B".

In the present embodiment, the first identification code of the first transmitter device and the second identification code of the second transmitter device can be exemplified by the color identification code assigned to the corresponding transmitter device after manufacture, but the embodiment is not limited thereto. The first identification code can also be selected from a group consisting of hardware serial number, user inputted information and network address. For example, the first video source 350 providing the first video data Vid1 is an information processing device (such as a notebook computer) used by the first user; the information processing device executes an operating system (such as a Microsoft Windows); the first identification code is a user information, such as "Peter", provided by the operating system (such as a first user's personal information set in the console of Microsoft Windows); the information processing device transmits "Peter" as the first identification code to the first transmitter device 310. Also, the source of the first video data Vid1 is an information processing device (such as a notebook computer) having a camera, and when the camera takes a picture of the first user, the information processing device transmits the first user's picture as the first identification code to the first transmitter device 310. Also, the source of the first video data Vid1 is an information processing device (such as a notebook computer), and when the information processing device is connected to the Internet and has a network IP address, the information processing device transmits the network IP address as the first identification code to the first transmitter device 310. Also, the first transmitter device 310 has a hardware serial number after manufacture, and the first identification code is the hardware serial number after manufacture of the first transmitter device 310. Also, when the information processing device executes a communication software (such as Line, Skype) and obtains the user's personal information, such as "Peter", the information processing device transmits "Peter" as the first identification code to the first transmitter device 310. All of the above information capable of identifying the information processing device can be used as the first identification code. When the first identification code is "Peter", the hardware serial number or the network IP address, the first identification image is the image of these texts. When the first identification code is the first user's picture, the first identification image is the first user's picture.

Details of step 504 include step 608 of FIG. 6, whether the transmitter device has transmitted the video data to the receiver device 320 is determined. If yes, the method proceeds to step 610. Details of step 608 are the same as details of step 208.

As shown in FIG. 6, the method for identifying video signal source of the present embodiment may selectively include step 609. In step 609, whether there is more than one transmitter device transmitting the video data to the receiver device is determined. If yes, the method proceeds to step 610; otherwise, the method skips step 610. Details of step 609 are the same as details of step 209.

Details of steps 506~508 include step 610 of FIG. 6. In step 610, the corresponding color of the identification code received from the transmitter device is shown on the display device 360 by the receiver device 320, and a light whose color corresponds to the identification code is shown by the indicator on the transmitter device. Details of step 610 are the same as details of step 210.

In the second embodiment, the wireless presentation system of the present disclosure further performs step 612 of FIG. 6. In step 612, whether the transmitter device is powered off is determined. Thus, when the first transmitter device 310 continues to transmit the first video data Vid1 to the receiver device 320 and the transmitter device is not powered off, the receiver control unit 324 continues to output the first combined video data Vid_C1 to the display device 360.

Figure 7:
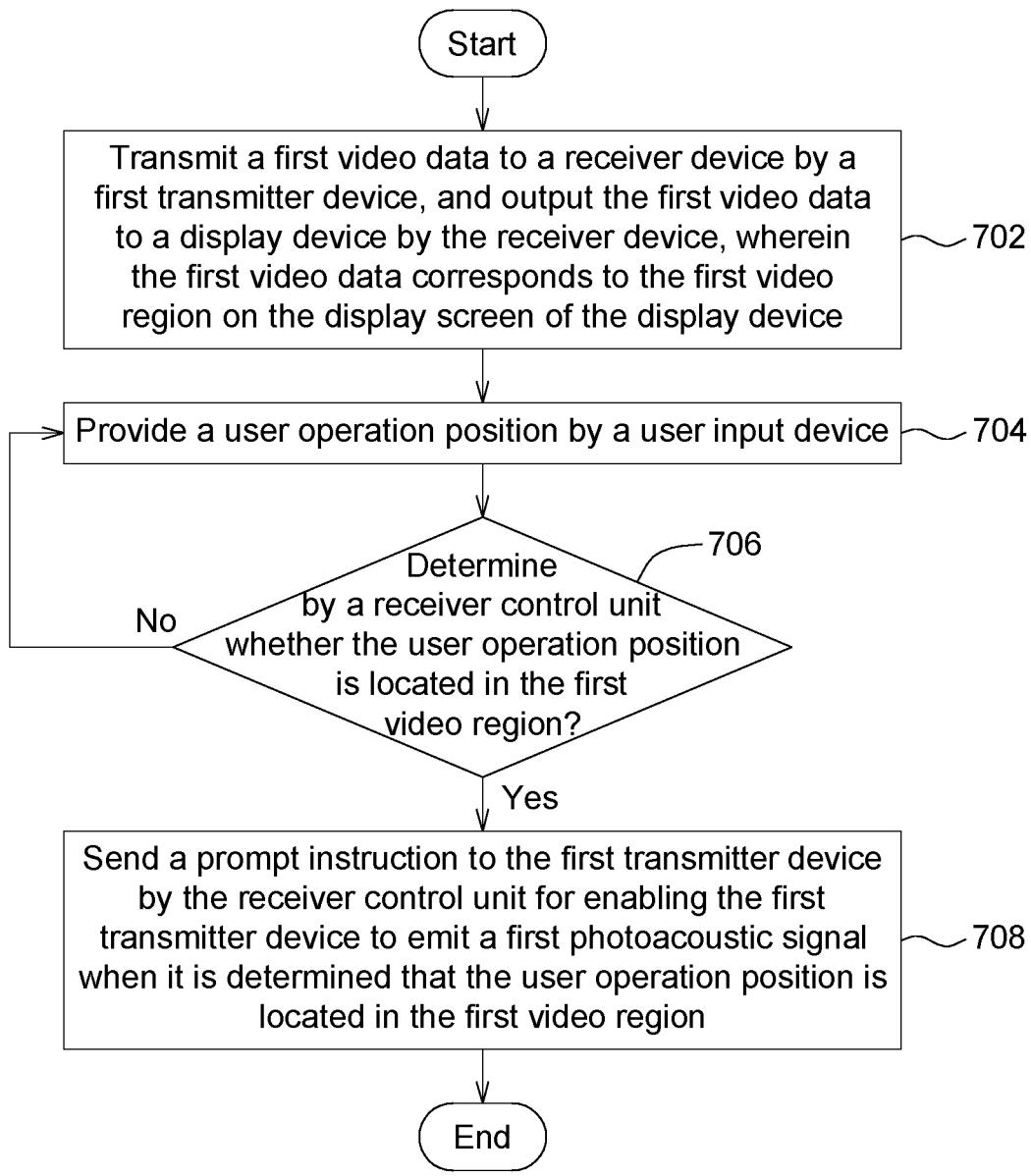
FIG. 7 is a flowchart of a method for identifying video signal source according to a third embodiment of the present disclosure.
Figure 8:
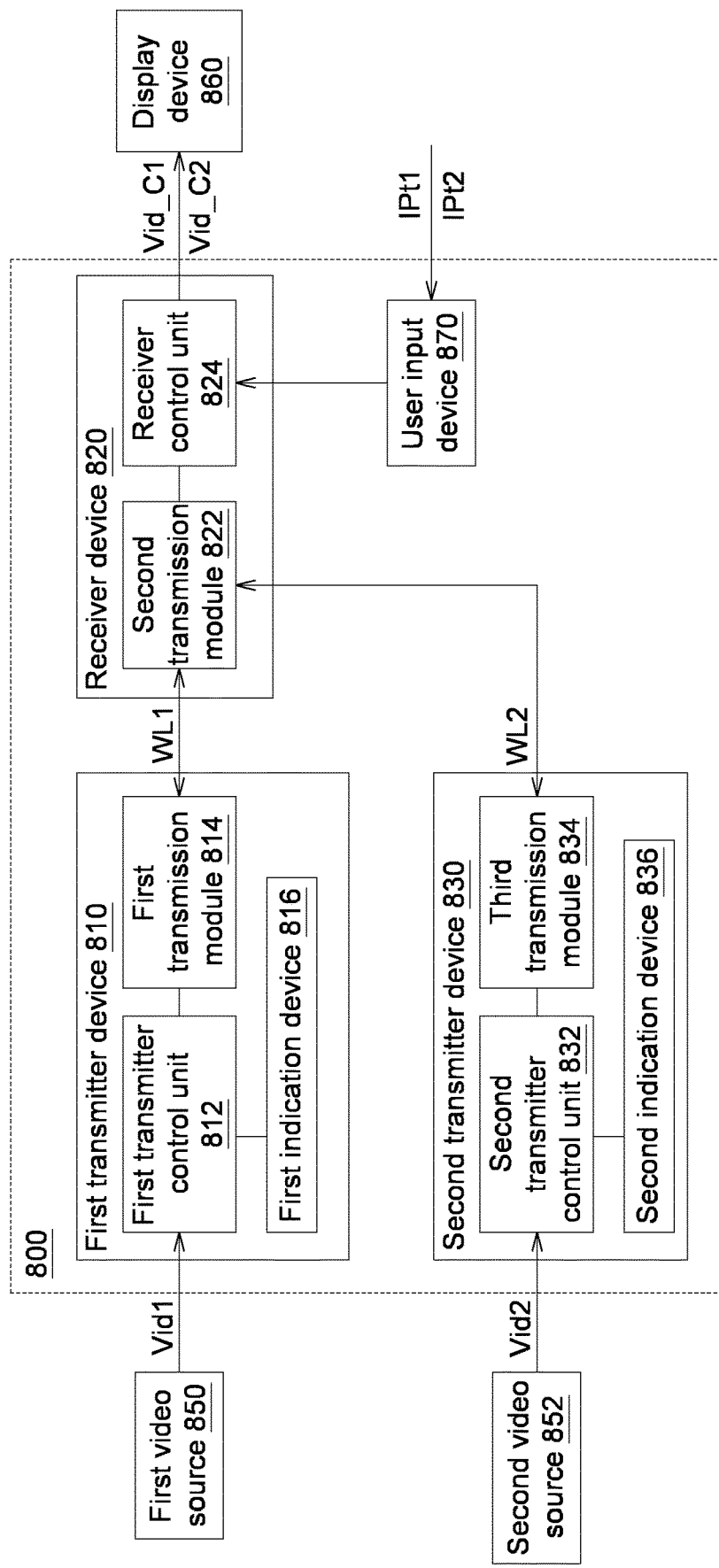
FIG. 8 is a block diagram of a wireless presentation system according to a third embodiment of the present disclosure.

Referring to FIG. 7, a flowchart of a method for identifying video signal source according to a third embodiment of the present disclosure is shown. Referring to FIG. 8, a block diagram of a wireless presentation system 800 according to a third embodiment of the present disclosure is shown. As shown in FIG. 7, the method for identifying video signal source of the present disclosure includes the following steps. In step 702, a first video data Vid1 is transmitted to a receiver device 820 by a first transmitter device 810, and the first video data Vid1 is outputted to a display device 860 by the receiver device 820. The first video data Vid1 corresponds to the first video region 862 on the display screen of the display device 860. In step 704, a user operation position is provided by a user input device 870. In step 706, whether the user operation position is located in the first video region 862 is determined by a receiver control unit 824. In step 708, when it is determined that the user operation position is located in the first video region 862, the receiver control unit 824 sends a prompt instruction to the first transmitter device 810 for enabling the first transmitter device 810 to emit a first photoacoustic signal.

As shown in FIG. 8, the wireless presentation system includes a first transmitter device 810 and a receiver device 820, and may selectively include a second transmitter device 830. The first transmitter device 810 includes a first transmitter control unit 812, a first transmission module 814 and a first indication device 816. The first transmitter control unit 812 is configured to receive a first video data Vid1 from the first video source 850, and the first transmission module 814 is configured to transmit the first video data Vid1. Similarly, the second transmitter device 830 includes a second transmitter control unit 832, a third transmission module 834 and a second indication device 836. The second transmitter control unit 832 is configured to receive a second video data Vid2 from the second video source 852, and the third transmission module 834 is configured to transmit the second video data Vid2. The receiver device 820 includes a second transmission module 822 and a receiver control unit 824. The second transmission module 822 may selectively establish connection with the first transmission module 814 to receive the first video data Vid1 and may selectively establish connection with the third transmission module 834 to receive the second video data Vid2. The receiver control unit 824 is configured to output the first video data Vid1 and the second video data Vid2 to the display device 860. When the first video data Vid1 is shown on the display device 860, the first video data Vid1 corresponds to the first video region 862, the second video data Vid2 corresponds to the second video region 866, and both the first video region 862 and the second video region 866 are shown in the form of split screen. The receiver control unit 824 receives a user operation position provided by the user input device 870.

Figure 9:
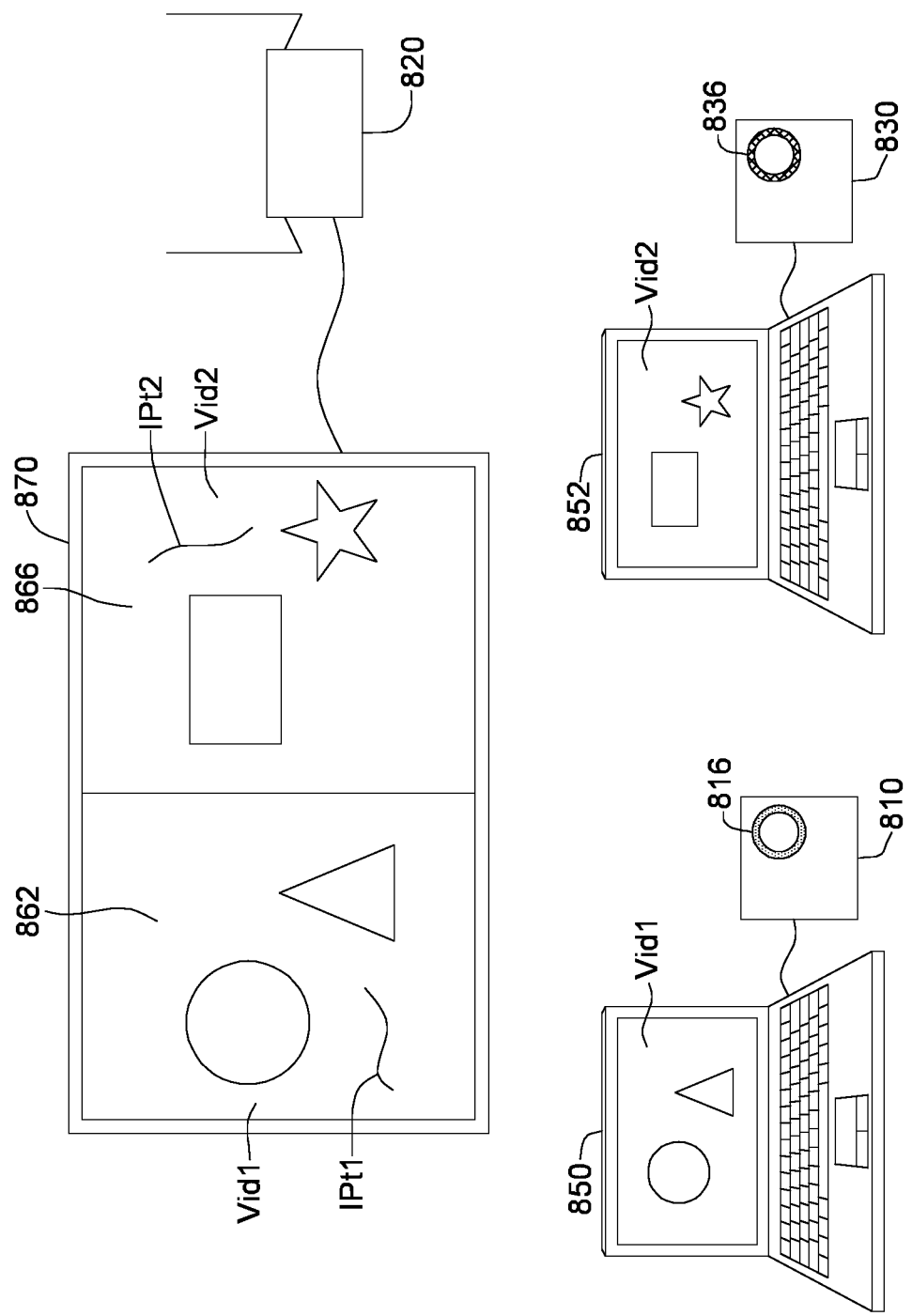
FIG. 9 is a schematic diagram of an application scenario of the wireless presentation system of FIG. 8.

Referring to FIG. 9, a schematic diagram of an application scenario of the wireless presentation system of FIG. 8 is shown. In the present embodiment, the user input device 870 is exemplified by a touch panel of a large-sized TV for the user to press and touch, but the embodiment is not limited thereto. The receiver control unit 824 outputs the first video data Vid1 and the second video data Vid2 to the display device 860. When the first video data Vid1 is shown on the display device 860, the first video data Vid1 corresponds to the first video region 862 at the left half of the display device 860, and the second video data Vid2 corresponds to the second video region 866 at the right half of the display device 860. The first video region 862 and the second video region 866 are shown in the form of split screen. When the user applies a first user operation Ipt1 (such as a press or touch) to the first video region 862 at the left half of the display device 860, the touch panel will provide relevant coordinate information of the user operation position to the receiver control unit 824. When the receiver control unit 824 receives a user operation position from the user input device 870 and it is determined that the user operation position is located in the first video region 862, the receiver control unit 824 sends a prompt instruction to the first transmitter device 810 for enabling the first indication device 816 of the first transmitter device 810 to emit a first photoacoustic signal. For example, the indicator on the first transmitter device 810 emits a red light, or a beeper beeps once. Similarly, when the user applies a second user operation Ipt2 (such as a press or touch) to the second video region 866 at the right half of the display device 860, the touch panel will provide relevant coordinate information of the user operation position to the receiver control unit 824. When the receiver control unit 824 receives a user operation position from the user input device 870 and it is determined that the user operation position is located in the second video region 866, the receiver control unit 824 sends a prompt instruction to the second transmitter device 830 for enabling the second indication device 836 of the second transmitter device 830 to emit a second photoacoustic signal. The second photoacoustic signal is different from the first photoacoustic signal. For example, the indicator on the second transmitter device 830 emits a green light, or a beeper beeps twice.

Figure 10:
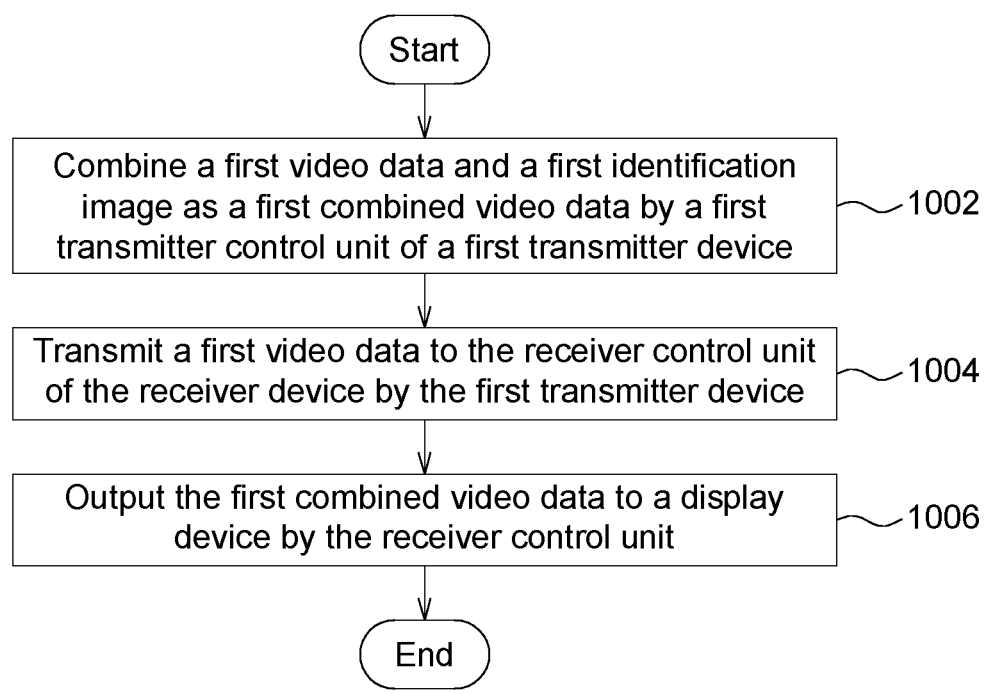
FIG. 10 is a flowchart of a method for identifying video signal source according to a fourth embodiment of the present disclosure.
Figure 12:
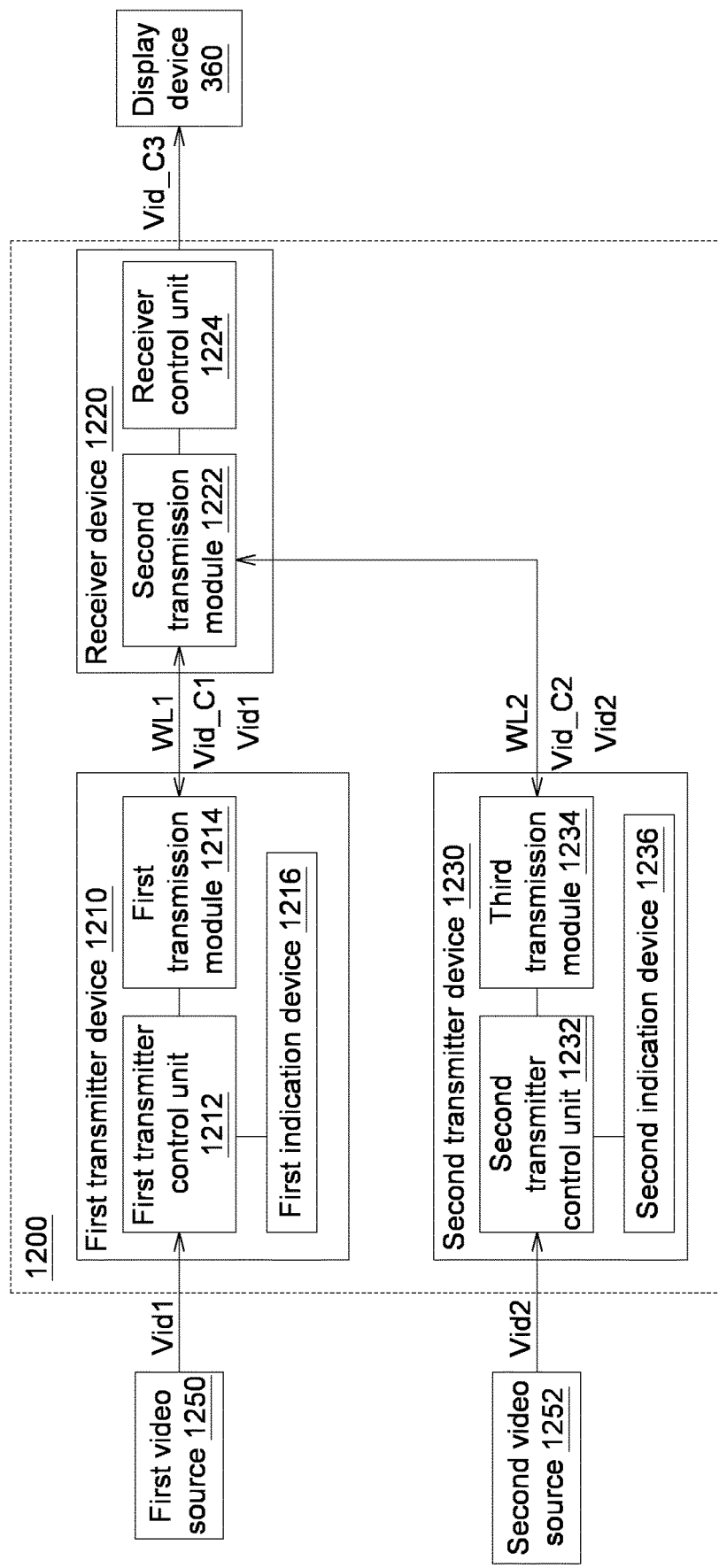
FIG. 12 is a block diagram of a wireless presentation system according to a fourth embodiment of the present disclosure.

Referring to FIG. 10, a flowchart of a method for identifying video signal source according to a fourth embodiment of the present disclosure is shown. Referring to FIG. 12, a block diagram of a wireless presentation system 1200 according to a fourth embodiment of the present disclosure is shown. As shown in FIG. 10, the method for identifying video signal source of the present disclosure includes the following steps. In step 1002, a first video data and a first identification image are combined as a first combined video data by a first transmitter control unit of a first transmitter device. The first identification image corresponds to the first identification code of the first transmitter device. In step 1004, the first combined video data is transmitted to the receiver control unit of the receiver device by the first transmitter device. In step 1006, the first combined video data is outputted to a display device by the receiver control unit.

As shown in FIG. 12, the wireless presentation system includes a first transmitter device 1210, a second transmitter device 1230 and a receiver device 1220. The first transmitter device 1210 includes a first transmitter control unit 1212, a first indication device 1216 and a first transmission module 1214. The first transmitter control unit 1212 is configured to receive a first video data Vid1 from the first video source 1250. The first transmitter control unit 1212 may selectively combine the first video data Vid1 and a first identification image corresponding to the first identification code as a first combined video data Vid_C1. The first identification image corresponds to the first identification code of the first transmitter device. The first transmission module 1214 is configured to transmit the first video data Vid1 or the first combined video data Vid_C1. Similarly, the second transmitter device 1230 includes a second transmitter control unit 1232, a second indication device 1236 and a third transmission module 1234. The second transmitter control unit 1232 is configured to receive a second video data Vid2 from the second video source 1252. The second transmitter control unit 1232 may selectively combine the second video data Vid2 and a second identification image corresponding to the second identification code as a second combined video data Vid_C2. The second identification image corresponds to the second identification code of the second transmitter device. The third transmission module 1234 is configured to transmit the second video data Vid2 or the second combined video data Vid_C2. The receiver device 1220 includes the second transmission module 1222 and the receiver control unit 1224. The second transmission module 1222 may selectively establish a wireless transmission WL1 with the first transmission module 1214 to receive the first video data Vid1 or the first combined video data Vid_C1. The second transmission module 1222 also may selectively establish a wireless transmission WL2 with the third transmission module 1234 to receive the second video data Vid2 or the second combined video data Vid_C2. When the receiver control unit 1222 receives the first combined video data Vid_C1 and the second combined video data Vid_C2 at the same time, the receiver control unit 1224 outputs the first combined video data Vid_C1 and the second combined video data Vid_C2 to the display device 360 on which the first combined video data Vid_C1 and the second combined video data Vid_C2 are shown in the form of split screen. For example, the receiver control unit 1222 combines the first combined video data Vid_C1 and the second combined video data Vid_C2 as a split screen video data Vid_C3 and outputs the split screen video data Vid_C3 to the display device 1260. In the present embodiment, each of the first transmitter control unit 1212, the second transmitter control unit 1232 and the receiver control unit 1222 has a combining circuit for combining the received combined video data.

Figure 11:
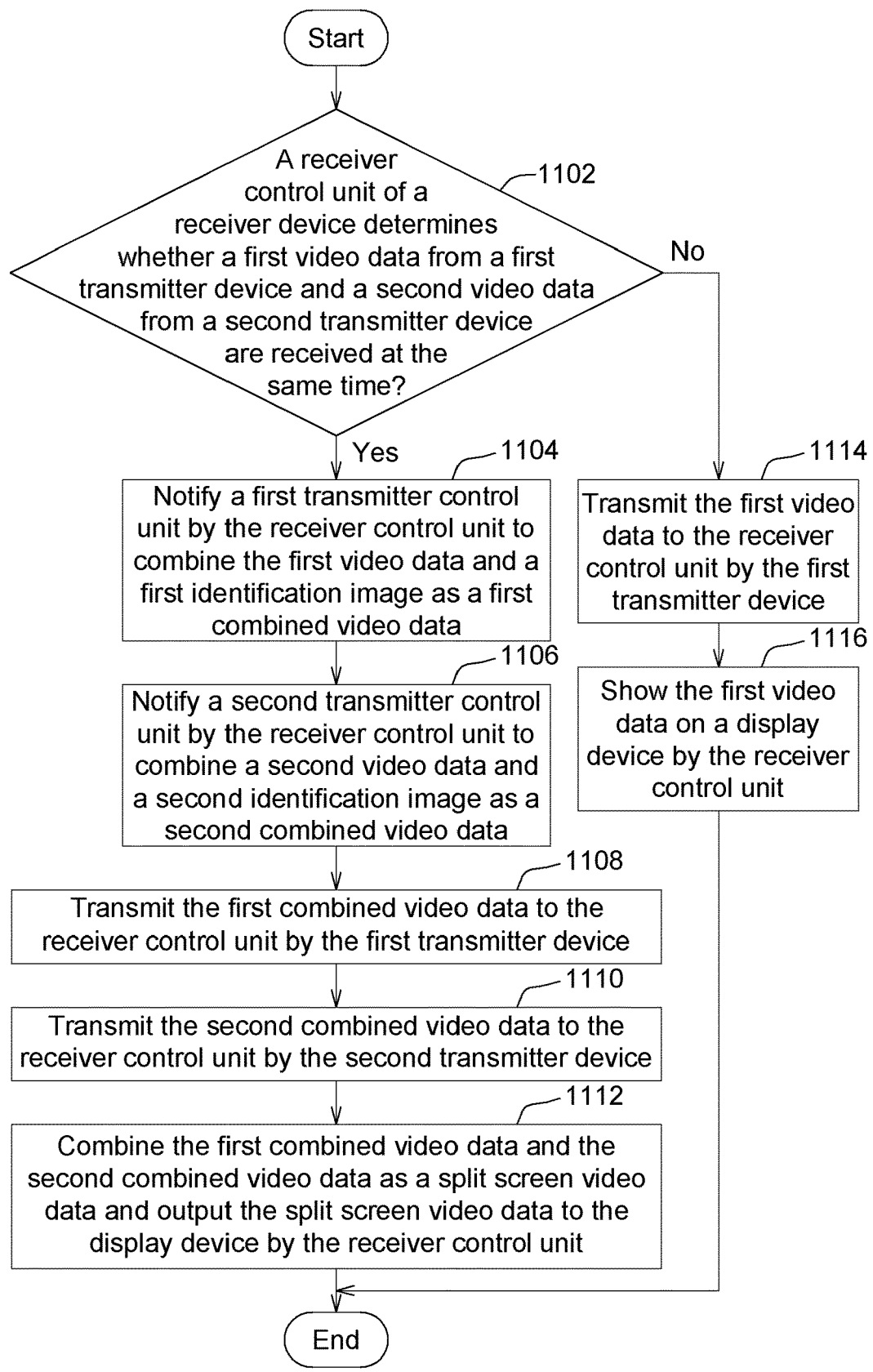
FIG. 11 is an example of a detailed flowchart of the method for identifying video signal source of FIG. 10.

Referring to FIG. 11, an example of a detailed flowchart of the method for identifying video signal source of FIG. 10 is shown. Step 1002 of FIG. 10 includes step 1104 of FIG. 11; step 1004 of FIG. 10 includes step 1108 of FIG. 11; step 1006 of FIG. 10 includes step 1112 of FIG. 11.

Refer to FIG. FIG. 11. In step 1104, the first transmitter control unit 1212 is notified by the receiver control unit 1224 to combine the first video data Vid1 and the first identification image as a first combined video data Vid_C1. After the first transmission module 1214 of the first transmitter device 1210 establishes connection with the second transmission module 1222 of the receiver device 1220, internal information of the receiver device 1220 and the first transmitter device 1210 are mutually updated with each other, and the first identification code is transmitted to the receiver control unit 1224 of the receiver device 1220 by the first transmitter device 1210. The first transmitter control unit 1212 and the receiver control unit 1224 both pre-store a list of identification codes and corresponding indicator colors. For example, an identification code #1 is assigned to the first transmitter device 1210 after manufacture, and the corresponding color of the first identification image is red; an identification code #2 is assigned to the second transmitter device 1230 after manufacture, and the corresponding color of the second identification image is green; and the rest can be obtained by the same analogy. Thus, when the first transmitter device 1210 establishes connection with the receiver device 1220, the receiver control unit 1224 records that the first transmitter device 1210 has the identification code #1. Similarly, afterwards, when the second transmitter device 1230 establishes connection with the receiver device 1220, the receiver control unit 1224 records that the second transmitter device 1230 has the identification code #2. By looking up the internally pre-stored list of identification codes and corresponding indicator colors, the receiver control unit 1224 can obtain that the color of the first identification image corresponding to the identification code #1 is red, and the color of the second identification image corresponding to the identification code #2 is green. In the present embodiment, the first identification image and the second identification image are respectively exemplified by red and green, but the embodiment is not limited thereto. For example, the first identification image and the second identification image can also be exemplified by numeric numbers "1" and "2" or English alphabets "A" and "B".

In step 1106, the second transmitter control unit 1232 is notified by the receiver control unit 1224 to combine the second video data Vid2 and the second identification image as a second combined video data Vid_C2.

In step 1108, the first combined video data Vid_C1 is transmitted to the receiver control unit 1224 by the first transmitter device 1210. In step 1110, the second combined video data Vid_C2 is transmitted to the receiver control unit 1224 by the second transmitter device 1230. In step 1112, the first combined video data Vid_C1 and the second combined video data Vid_C2 are combined as a split screen video data Vid_C3 by the receiver control unit 1224, and the split screen video data Vid_C3 is further outputted to the display device 1260 by the receiver control unit 1224.

As shown in FIG. 11, the method for identifying video signal source of the present embodiment may selectively include steps 1102, 1114 and 1116. In step 1102, whether the first video data Vid1 from the first transmitter device 1210 and the second video data Vid2 from the second transmitter device 1230 are received by the receiver control unit 1224 of the receiver device 1220 at the same time is determined. If yes, the method proceeds to step 1104; otherwise the method proceeds to step 1114. Through step 1102, whether there is more than one transmitter device transmitting the video data to the receiver device 1220 is determined by the receiver control unit 1224. Steps 1114~1116 have scenarios (1) and (2) disclosed below. Scenario (1): Both the first transmitter device 1210 and the second transmitter device 1230 have established connection with the receiver device 1220 but only the first transmitter device 1210 is transmitting the first video data Vid1 to the receiver device 1220 and the entire screen of the display device 1260 is showing the first video data Vid1. Under such circumstance, the conference participants can clearly identify that it is t the first transmitter device 1210 currently operated by the presenter is outputting the first video data Vid1, and the first transmitter control unit 1212 does not need to show the corresponding color of the identification code on the display device 1260. For example, the first transmitter control unit 1212 can turn off the video combining circuit of the first transmitter control unit 1212 to reduce the power consumption of the first transmitter control unit 1212. Scenario (2): Both the first transmitter device 1210 and the second transmitter device 1230 have established connection with the receiver device 1220. The first transmitter device 1210 transmits the first video data Vid1 to the receiver device 1220 and at the same time the second transmitter device 1230 transmits the second video data Vid2 to the receiver device 1220, and the display device 1260 shows the first video data Vid1 and the second video data Vid2 in the form of split screen. Under such circumstance, the conference participants cannot clearly identify the video signal source, and therefore the first transmitter control unit 1212 needs to show the corresponding color of the identification code on the display device 1260. For example, the first transmitter control unit 1212 turns on the video combining circuit of the first transmitter control unit 1212. With regard to the scenarios (1) and (2) disclosed above, the first transmitter control unit 1212 can dynamically turn off the video combining circuit of the first transmitter control unit 1212 to dynamically reduce the power consumption of the first transmitter control unit 1212 and achieve power saving.

As disclosed above, step 1114 corresponds to the scenario where the receiver control unit 1224 either receives the first video data Vid1 from the first transmitter device 1210 or receives the second video data Vid2 from the second transmitter device 1230. In the present disclosure, step 1114 is exemplified by the scenario that the receiver control unit 1224 receives the first video data Vid1 from the first transmitter device 1210. In step 1114, the first video data Vid1 is transmitted to the receiver control unit 1224 by the first transmitter device 1210. In step 1116, the first video data Vid1 is shown on the display device 1260 by the receiver control unit 1224. As shown in FIG. 11, steps 1114~1116 are exemplified by the scenario that the receiver control unit 1224 receives the first video data Vid1 and does not receive the second video data Vid2, but the embodiment is not limited thereto. Similarly, in step 1114, when the receiver control unit 1224 receives the second video data Vid2 and does not receive the first video data Vid1, then steps 1114~1116 are correspondingly modified as follows: In step 1114, the second video data Vid2 is transmitted to the receiver control unit 1224 by the second transmitter device 1230; in step 1116, the second video data Vid2 is shown on the display device 1260 by the receiver control unit 1224.

In step 1104, the first video data Vid1 and the first identification image (such as a red identification image) are combined as a first combined video data Vid_C1 by the first transmitter control unit 1212 of the first transmitter device 1210 according to the first identification code, and the first combined video data Vid_C1 is outputted to the receiver device 1220 by the first transmitter control unit 1212. When the first combined video data Vid_C1 is shown on the display device 1260, the first combined video data Vid_C1 corresponds to the first video region and the first identification region adjacent to the first video region, the first video region shows the first video data Vid1, and the first identification region shows the first identification image. The first video region and the first identification region of the present embodiment are the same as the first video region 462 and the first identification region 464 of the first embodiment of FIG. 4A~4C. The first indication device 1216 of the first transmitter device 1210 shows the first identification image (such as a red identification image). In the present embodiment, the first transmitter control unit 1212 combines the first video data Vid1 and a red identification image as a first combined video data Vid_C1, such that the display device 1260 shows the corresponding red identification image and the indicator on the first transmitter device 1210 shows a red light corresponding to the identification code #1. By the same analogy, the second transmitter control unit 1232 combines the second video data Vid2 and a green identification image as a second combined video data Vid_C2 and outputs the second combined video data Vid_C2 to the receiver device 1220, such that the display device 1260 shows a corresponding green identification image, and the second indication device 1236 (such as an indicator) on the second transmitter device 1230 shows a green light corresponding to the identification code #2.

In the present embodiment, the first identification code of the first transmitter device and the second identification code of the second transmitter device can be, for example, the color identification code assigned to the transmitter device after manufacture, but the embodiment is not limited thereto. The first identification code can also be selected from a group consisting of hardware serial number, user inputted information and network address. For example, the first video source 1250 providing the first video data Vid1 is an information processing device (such as a notebook computer) used by the first user. The information processing device executes an operating system (such as a Microsoft Windows). The first identification code, such as "Peter", is user information provided by the operating system (such as a first user's personal information set in the console of Microsoft Windows). The information processing device transmits "Peter" as the first identification code to the first transmitter device 1210. Also, the source of the first video data Vid1 is an information processing device (such as a notebook computer) having a camera. When the camera takes a picture of the first user, the information processing device transmits the first user's picture as the first identification code to the first transmitter device 1210. Also, for example, the source of the first video data Vid1 is an information processing device (such as a notebook computer). When the information processing device is connected to the Internet and has a network IP address, the information processing device transmits the network IP address as the first identification code to the first transmitter device 1210. Also, the first transmitter device 1210, for example, has a hardware serial number, and the first identification code is the hardware serial number of the first transmitter device 1210. Furthermore, for example, when the information processing device executes a communication software (such as Line, Skype), and obtains the personal information of the user logging in the communication software, such as "Peter", the information processing device transmits "Peter" as the first identification code to the first transmitter device 1210. All of the above information capable of identifying the information processing device can be used as the first identification code. When the first identification code is "Peter", the hardware serial number or the network IP address, the first identification image is the image of these texts. When the first identification code is the first user's picture, the first identification image is the first user's picture.

In the method for identifying video signal source and a wireless presentation system using the same according to the embodiments of the present disclosure, through the corresponding relation among (1) the first video region 362 on the display screen of the display device 360 (2) the first identification image in the first identification region 464 adjacent to the first video region 362 on the display screen of the display device 360 and (3) the first identification image shown on the first indication device 316 of the first transmitter device 310, the conference participants can easily identify which presenter corresponds to the video signal source of the first video region 362 on the split screen of the display device 360. On the other hand, through detecting the position of the user's input operation on the split screen of the display device 860 by the user input device 870, when the receiver control unit 824 determines that the user operation position is located in the first video region 862, the receiver control unit 824 sends a prompt instruction to the first transmitter device 810 for enabling the first transmitter device 810 to emit a first photoacoustic signal, such that the conference participants can easily identify which presenter corresponds to the current video signal source at the position of the user's input operation. When a conventional method is used, the conference participants is unable to identify which presenter's information processing device corresponds to each video signal source of the video regions on the split screen of the display device. Thus, the method of the present disclosure resolves the identification failure problem encountered in the conventional method, and helps the conference participants to quickly identify the presenter providing the video signal source corresponding to a particular frame on the split screen and then easily raise questions for discussion to the right person.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for identifying video signal source, comprising:
   assigning a first identification code to a first transmitter device by a receiver control unit of a receiver device;
   transmitting a first video data by the first transmitter device;
   combining the first video data and a first identification image corresponding to the first identification code as a first combined video data by the receiver control unit of the receiver device;
   outputting the first combined video data to a display device by the receiver control unit of the receiver device; and
   assigning a second identification code to a second transmitter device by the receiver control unit of the receiver device, transmitting a second video data by the second transmitter device, combining the second video data and a second identification image corresponding to the second identification code as a second combined video data, combining the first combined video data and the second combined video data as a split screen video data and outputting the split screen video data to the display device by the receiver control unit of the receiver device;
   wherein when the first transmitter device transmits the first video data to a second transmission module of the receiver device, the receiver control unit of the receiver device sends a first prompt instruction to request a first indication device of the first transmitter device to show the first identification image;
   wherein the source of the first video data is an information processing device, the first transmitter device is connected to the information processing device;
   wherein the receiver device, the first transmitter device, and the second transmitter device are portable;
   wherein the first video data corresponds to a first video region on a display screen of the display device, a user operation position is provided by a user input device;
   wherein whether the user operation position is located in the first video region is determined by the receiver control unit, when it is determined that the user operation position is located in the first video region, the receiver control unit sends a second prompt instruction to the first transmitter device.

2. The method for identifying video signal source according to claim 1, wherein in the step of assigning the first identification code by the receiver control unit of the receiver device, the receiver control unit of the receiver device assigns the first identification code to the first transmitter device when the receiver device establishes connection with the first transmitter device.

3. The method for identifying video signal source according to claim 1, further comprising: when the first combined video data is shown on the display device, the first combined video data corresponds to the first video region and a first identification region adjacent to the first video region, the first video region shows the first video data, and the first identification region shows the first identification image.

4. The method for identifying video signal source according to claim 1, further comprising:
   when the first transmitter device stops transmitting the first video data to a second transmission module of the receiver device, cancelling the corresponding relation between the first identification code and the first transmitter device by the receiver control unit of the receiver device.

5. The method for identifying video signal source according to claim 1, wherein the first identification image is a first color, and when the receiver control unit of the receiver device requests the first transmitter device to show the first identification image, the first indication device on the first transmitter device shows the first color.

6. A method for identifying video signal source, comprising:
   transmitting a first video data and a first identification code to a receiver control unit of a receiver device by a first transmitter device;
   combining the first video data and a first identification image corresponding to the first identification code as a first combined video data by the receiver control unit of the receiver device;
   outputting the first combined video data to a display device by the receiver control unit of the receiver device; and
   transmitting a second video data and a second identification code by a second transmitter device, combining the second video data and a second identification image corresponding to the second identification code as a second combined video data by the receiver control unit of the receiver device, combining the first combined video data and the second combined video data as a split screen video data and outputting the split screen video data to the display device by the receiver control unit of the receiver device;
   wherein the source of the first video data is an information processing device, and the first identification code is a network IP address of the information processing device, a hardware serial number after manufacture of the first transmitter device, or a obtained user's personal information when the information processing device executes a communication software;
wherein the first transmitter device is connected to the information processing device;
wherein the receiver device, the first transmitter device, and the second transmitter device are portable;
wherein the first video data corresponds to a first video region on a display screen of the display device, a user operation position is provided by a user input device;
wherein whether the user operation position is located in the first video region is determined by the receiver control unit, when it is determined that the user operation position is located in the first video region, the receiver control unit sends a first prompt instruction to the first transmitter device.

7. The method for identifying video signal source according to claim 6, wherein in the step of transmitting the first video data and the first identification code by the first transmitter device, the first transmitter device transmits the first identification code when the receiver device establishes connection with the first transmitter device.

8. The method for identifying video signal source according to claim 6, wherein when the first combined video data is shown on the display device, the first combined video data corresponds to the first video region and a first identification region adjacent to the first video region, the first video region shows the first video data, and the first identification region shows the first identification image.

9. The method for identifying video signal source according to claim 6, wherein when the first transmitter device transmits the first video data to a second transmission module of the receiver device, the receiver control unit of the receiver device sends a second prompt instruction to request a first indication device of the first transmitter device to show the first identification image.

10. The method for identifying video signal source according to claim 6, wherein the first identification code is selected from a group consisting of the hardware serial number, a user inputted information and a network address.

11. The method for identifying video signal source according to claim 10, wherein the information processing device performs an operating system, and the first identification code is the network IP address of the information processing device, the hardware serial number after manufacture of the first transmitter device, the obtained user's personal information when the information processing device executes a communication software, or user information provided by the operating system.

12. A method for identifying video signal source, comprising:
assigning a first identification code to a first transmitter device and assigning a second identification code to a second transmitter device by a receiver control unit of a receiver device; and
performing the following steps by the receiver control unit of the receiver device when the receiver control unit of the receiver device receives a first video data from the first transmitter device and a second video data from the second transmitter device at the same time:
combining the first video data and a first identification image corresponding to the first identification code as a first combined video data;
combining the second video data and a second identification image corresponding to the second identification code as a second combined video data; and
combining the first combined video data and the second combined video data as a split screen video data and outputting the split screen video data to a display device;
wherein when the first transmitter device transmits the first video data to a second transmission module of the receiver device, the receiver control unit of the receiver device sends a first prompt instruction to request a first indication device of the first transmitter device to show the first identification image;
wherein the source of the first video data is an information processing device, the first transmitter device is connected to the information processing device;
wherein the receiver device, the first transmitter device, and the second transmitter device are portable;
wherein the first video data corresponds to a first video region on a display screen of the display device, a user operation position is provided by a user input device;
wherein whether the user operation position is located in the first video region is determined by the receiver control unit, when it is determined that the user operation position is located in the first video region, the receiver control unit sends a second prompt instruction to the first transmitter device.

13. The method for identifying video signal source according to claim 12, further comprising: outputting the first video data to the display device by the receiver control unit of the receiver device without combining the first video data and the first identification image when the receiver control unit of the receiver device receives the first video data from the first transmitter device but does not receive the second video data from the second transmitter device.

14. A method for identifying video signal source, comprising:
performing the following steps by the receiver control unit of the receiver device when a receiver control unit of a receiver device receives a first video data and a first identification code from a first transmitter device and receives a second video data and a second identification code from a second transmitter device at the same time:
combining the first video data and a first identification image corresponding to the first identification code as a first combined video data by the receiver control unit of the receiver device;
combining the second video data and a second identification image corresponding to the second identification code as a second combined video data by the receiver control unit of the receiver device; and
combining the first combined video data and the second combined video data as a split screen video data and outputting the split screen video data to a display device by the receiver control unit of the receiver device;
wherein the source of the first video data is an information processing device, and the first identification code is a network IP address of the information processing device, a hardware serial number after manufacture of the first transmitter device, or a obtained user's personal information when the information processing device executes a communication software;
wherein the first transmitter device is connected to the information processing device;
wherein the receiver device, the first transmitter device, and the second transmitter device are portable;
wherein the first video data corresponds to a first video region on a display screen of the display device, a user operation position is provided by a user input device;

wherein whether the user operation position is located in the first video region is determined by the receiver control unit, when it is determined that the user operation position is located in the first video region, the receiver control unit sends a first prompt instruction to the first transmitter device.

15. The method for identifying video signal source according to claim 14, further comprising: outputting the first video data to the display device by the receiver control unit of the receiver device without combining the first video data and the first identification image when the receiver control unit of the receiver device receives the first video data from the first transmitter device but does not receive the second video data from the second transmitter device.

16. The method for identifying video signal source according to claim 14, wherein when the first combined video data is shown on the display device, the first combined video data corresponds to the first video region and a first identification region adjacent to the first video region, the first video region shows the first video data, and the first identification region shows the first identification image.

17. The method for identifying video signal source according to claim 14, wherein when the first transmitter device transmits the first video data to a second transmission module of the receiver device, the receiver control unit of the receiver device sends a second prompt instruction to request a first indication device of the first transmitter device to show the first identification image.

* * * * *